Aug. 8, 1939.   C. M. FIELDS ET AL   2,168,331
CAST RESIN WITH INTEGRAL SHEEN
Filed Oct. 17, 1936
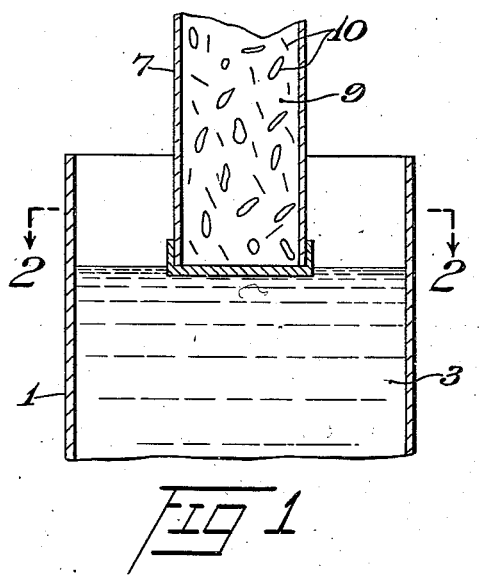
Fig. 1
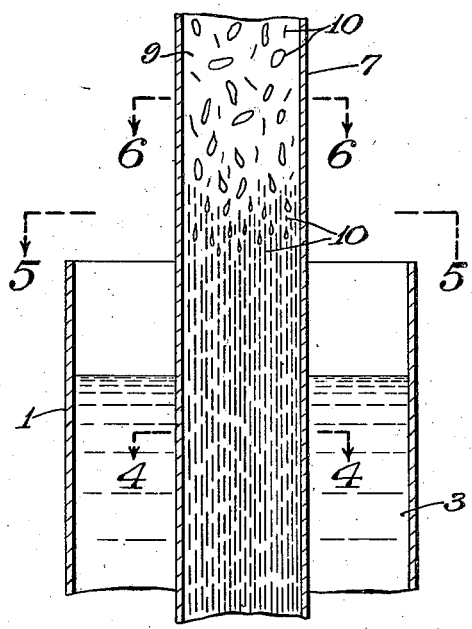
Fig. 3
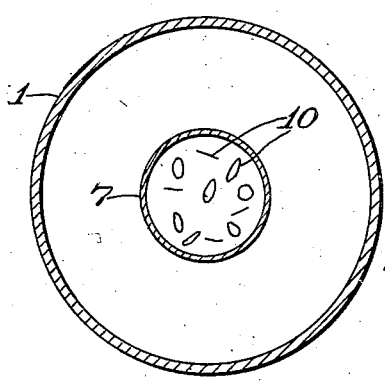
Fig. 2
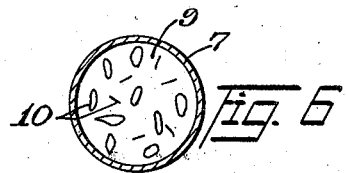
Fig. 8
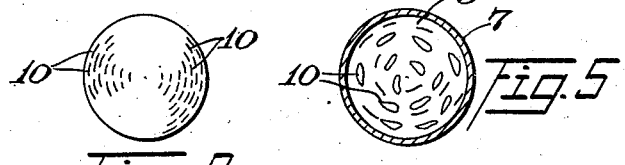
Fig. 6
Fig. 5
Fig. 4
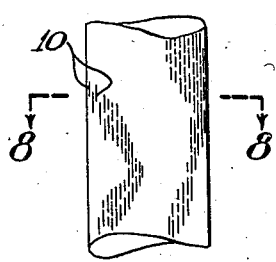
Fig. 7
Charles M. Fields
George A. Wilkens  INVENTORS
BY
J. M. Castle Jr.
ATTORNEY.

Patented Aug. 8, 1939

2,168,331

UNITED STATES PATENT OFFICE 2,168,331

CAST RESIN WITH INTEGRAL SHEEN

Charles M. Fields, Arlington, and George A. Wilkens, Ridgefield, N. J., assignors to E. I. du Pont de Nemours & Company, Wilmington, Del., a corporation of Delaware Application October 17, 1936, Serial No. 106,252

11 Claims. (Cl. 18—58)

This invention relates to cast synthetic resin and, more particularly, to the preparation of such resin in the form of rods and similar elongated bodies having integral sheen.

For the sake of simplicity the term "integral sheen" will be used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation, within the material, of lamellae (flat plates, crystals, and the like) of substances capable of reflecting light. As regards appearance, the term thus includes the various types of sheen and character of sheen commonly designated, in the plastics industry, by the terms pearly, nacreous, silky, metallic, chatoyant, etc.

Various substances, characterized in common by their occurrence in the form of light-reflecting lamellae, have been widely used for the purpose of imparting integral sheen to various transparent or substantially transparent materials such as cellulose ester and resin plastics. Such substances, including the so-called pearl essence obtained from fish scales, various inorganic and organic substitutes therefor, and metal bronzing powders are well known to the art, as are also various methods whereby their lamellae may be brought into systematic orientation so as to yield certain desired visual effects. It is well recognized that to obtain a sheen effect the light-reflecting lamellae must be positioned or oriented so that a large percentage of them lie with their broad faces parallel to each other and substantially parallel to the surface of the plastic which is to have the appearance of sheen.

Heretofore, no method has been known by which synthetic resin rods or the like could be made with a uniform integral sheen over their entire peripheral surface nor with a uniform orientation of the light-reflecting lamellae concentric with the periphery throughout the entire thickness of the rod, such orientation being hereinafter referred to as "concentric orientation".

An object of the present invention is to provide a method of preparing synthetic resin rods and similar elongated bodies with a uniform integral sheen over their entire peripheral surface and having a concentric orientation of light-reflecting lamellae throughout. A further object is to prepare said rods of appreciable lengths in untapered form.

The above objects are accomplished according to the present invention by introducing a liquid polymerizable organic compound having light-reflecting lamellae suspended therein, into an elongated mold closed at one end, applying heat to a narrow zone at the closed end of the mold until the organic compound in that zone is substantially polymerized, and progressively advancing the heating zone along the major axis of the mold at about the rate at which the organic compound in the mold is being polymerized while maintaining the liquid organic compound ahead of the advancing heating zone at a temperature below that at which the organic compound will undergo active polymerization. As an alternative procedure which is not preferred, the polymerizable organic compound could be subjected to a polymerizing influence other than heat, such as sunlight, the principle of slowly advancing the zone subjected to polymerizing influence being followed in the same manner.

In application Serial Number 28,404, now United States Patent Number 2,057,674, filed June 26, 1935, entitled "Polymerization process", applicant, Charles M. Fields, is disclosed in complete detail the process of polymerizing liquid polymerizable organic compounds by the progressive advance of a narrow heating zone as set forth above. Operating conditions, apparatus, and the various polymerizable organic compounds adapted for use in the process are set forth fully in that application and will only be referred to herein briefly with respect to specific examples illustrating the present invention. Also, in application Serial Number 28,403, now United States Patent Number 2,057,673, filed June 26, 1935, entitled "Preparation of polymerized organic compounds", applicant, Reuben T. Fields, is disclosed an improved process for producing rods and the like in continuous lengths by the progressive advancing of a narrow heating zone as set forth above.

The present invention resides in the discovery that, when a body of liquid polymerized organic compound containing light-reflecting lamellae suspended therein, is polymerized in a cylindrical or other elongated mold by progressively advancing a narrow heating zone along the mold as polymerization occurs, an unexpected, highly unique and novel result is obtained. The light-reflecting lamellae which are not oriented in any particular system in the liquid introduced in the mold, are gradually brought into a systematic orientation as the polymerization of the liquid takes place and, as polymerization reaches completion in each zone of heating so that the liquid is converted into a solid synthetic resin, the lamellae are fixed in a substantially perfect concentric orientation with respect to the major axis of this synthetic resin body being formed. If, instead of a cylindrical mold, an elongated mold that is hexagonal or octagonal or irregular shape in cross section is used, the orientation of the lamellae is parallel to the surface of the mold cavity but becomes concentric as the center of the elongated body or rod is approached.

The resulting rod made according to the present invention exhibits a uniform integral sheen over its entire peripheral surface with the possible exception of that portion immediately adjacent the closed end of the mold first subjected to polymerizing influence. Further, the rod retains the uniform integral sheen as it is turned down by machine illustrating clearly that the orientation of the lamellae is concentric with respect to the major axis of the rod. Rods exhibiting such orientation were not known heretofore nor did the prior art appreciate that there was any way that such rods could be made.

In the accompanying drawing forming a part of the present application;

Fig. 1 is a diagrammatic axial vertical section through one form of apparatus adapted to carry out the present invention, parts being broken away at the top and bottom of the apparatus; the elements of the apparatus are shown in this figure in their relative positions at the initial stage of the process;

Fig. 2 is a diagrammatic horizontal section at the line 2—2 of Fig. 1;

Fig. 3 is a section similar to Fig. 1 but illustrates the relative positions of the elements of the apparatus at an intermediate stage of the process;

Figs. 4, 5 and 6 are diagrammatical horizontal sections of the mold and its contents at the lines 4—4, 5—5, and 6—6, respectively, of Fig. 3;

Fig. 7 is a diagrammatic vertical section of a rod made in accordance with one specific embodiment of the invention;

Fig. 8 is a diagrammatic horizontal section at the line 8—8 of Fig. 7.

Referring to Figs. 1–6, inclusive, particularly to Figs. 1 and 2, reference numeral 1 indicates an elongated vessel containing a heating liquid 3, conveniently water. Within the vessel 1 is disposed the mold 7 containing the polymerizable liquid organic compound 9 having suspended therein light-reflecting lamellae 10, 10. The lamellae 10, 10 are shown in greatly exaggerated size and in exagggeratedly small number for the sake of clarity and the direction of the plane of orientation of each lamella is indicated in the drawing by showing as circles those lamallae which are in a plane at right angles to the line of sight, by straight lines those which are viewed edge-on, and by ovals those which lie in other planes.

Cross-hatching is omitted from the views of the polymerizable liquid and the polymerized resinous product in order that the orientation of the lamellae may be more clearly shown.

As illustrated in Fig. 1, the mold 7 is at its position at the initial stage of the process, the bottom end of the mold being just submerged in the heating liquid 3. In this position heat is only communicated to a shallow layer of the polymerizable liquid 9 thus causing it to polymerize while the liquid above that shallow layer remains relatively cool and does not undergo active polymerization. If desired, a cooling fluid may be circulated around the mold 7 above the surface of the liquid 3 to insure the maintenance of the liquid 9 above the heated layer at a temperature below that at which it will polymerize. As this initial shallow layer of the polymerizable liquid is converted to a solid polymerized product, the mold 7 is lowered into the liquid 3 so that a second shallow layer of the polymerizable liquid will undergo polymerization and this procedure is carried out, either step by step or continuously, until the entire contents of the mold 7 have been converted to a solid polymerized product.

In Fig. 3, the relative position of the mold 7 and heating liquid 3 is shown at a later stage in the process after a considerable amount of the polymerizable liquid at the lower end of the mold has been polymerized to a solid, i. e., that portion from the bottom of the mold approximately to the level of the free surface of the heating liquid 3. Above this solid material, and approximately at the level of the free surface of the heating liquid 3, is a zone of material which is actively undergoing polymerization and above this is the remainder of the initial polymerizable liquid which has not yet entered the zone of polymerizing temperature. The solid, the semi-solid, and the still liquid polymerizable compound are not distinguishable by any abrupt change of condition as one blends into the other.

In the conversion of the liquid organic compound to a solid by the polymerization reaction, an appreciable shrinkage of the compound takes place, for example, with methyl methacrylate the shrinkage in conversion from monomer to polymer is approximately 21%. Due to this shrinkage a certain amount of flow of the polymerizable liquid takes place in the mold, and this unexpectedly effects an almost perfect concentric orientation of the light-reflecting lamellae which are oriented in random fashion in the polymerizable liquid as it is introduced into the mold.

Referring to Fig. 4, there is shown a section through the mold 7 in Fig. 3 at the line 4—4. In this portion of the mold the polymerizable liquid has been converted to a solid and the light-reflecting lamellae have been oriented concentrically with respect to the major axis of the mold and are fixed in that position. In Fig. 5 showing a section through the mold 7 of Fig. 3 at the line 5—5, polymerization of the liquid organic compound has commenced and the flow of the polymerizable liquid to compensate for shrinkage has effected a partial but not complete concentric orientation of the light-reflecting lamellae 10, 10. As indicated in Fig. 6, the light-reflecting lamellae 10, 10 at the line 6—6 of mold 7 in Fig. 3 are still oriented haphazardly as the material in this portion of the mold has not commenced to polymerize. It will be understood that Figs. 3, 4, 5, and 6 are highly diagrammatic and are merely intended to illustrate the progress of the concentric orientation of the light-reflecting lamellae at different portions of the mold.

As the mold 7 is lowered into the heating liquid 3 until the level of the liquid has come up to the top of the contents of the mold 7, the polymerizable organic compound is completely converted to a solid with the light-reflecting lamellae fixed in concentric orientation and therefore the mold may be removed. By chilling the mold, the rod of synthetic resin thus obtained may be removed. Due to differential shrinkage of the synthetic resin and the mold the rod formed may be readily removed without the necessity of using a tapered mold.

The following examples are given to illustrate specific embodiments of the invention, parts being by weight where not otherwise specified:

*Example 1.*—Monomeric methyl methacrylate is maintained at a temperature of 80° C. for about three hours to obtain a syrup of polymerized methyl methacrylate dissolved in monomeric methyl methacrylate. This syrup at room temperature has about the viscosity of heavy molasses. To the syrup is added 0.1% by weight of benzoyl peroxide and 0.3% of Paispearl paste, a commercial preparation of fish scale essence. After thorough mixing, the syrup is loaded into a 36 inch length of seamless aluminum pipe of inside diameter 0.815 inch. This aluminum pipe is capped at the bottom, filled with the syrup to a depth of 34 inches, and a fitting placed on the top, which fitting connects to a valve of a container of nitrogen gas under pressure.

The mold is fixed in vertical position and the lower end of the mold is brought into contact with a water bath maintained at 75 to 80° C. and thereafter is accurately and steadily lowered into the water bath at a rate of 1.5 inches per hour, so that immersion to a depth of 34 inches is completed in from 22 to 23 hours. Throughout this treatment the contents of the mold are kept under a pressure of about 175 pounds per square inch supplied by the compressed nitrogen. At the end of the treatment, the application of pressure is discontinued, the mold detached from its fitting, removed from the hot water and cooled. The solid polymer is readily ejected from the mold and is in the form of a continuous rod of uniform diameter and smooth surface, characterized by a concentric orientation, producing an integral sheen, which is uniform and unbroken over its entire peripheral surface, except for a short distance at its lower end. That this sheen is the result of orientation of the lamellae of fish scale essence in concentric layers, may be shown by turning down a portion of the rod to a smaller diameter and polishing the fresh surface so exposed, which will be found to have the same sheen as that possessed by the original outside surface.

*Example 2.*—Styrol containing 0.1% benzoyl peroxide is heated gently until it has thickened to a syrup having at room temperature a viscosity of about that of molasses. To this syrup is then added 0.4% of Paispearl paste. This syrup at room temperature is then poured into a mold as in Example 1 and is polymerized from the bottom by immersion of the mold vertically downward into a water bath maintained at 120° C., at the rate of one inch per hour. Solid polymer is removed from the mold as in Example 1 and is found to possess an integral sheen due to concentric orientation.

Examples 3 to 10 illustrate further combinations of resin-forming liquids, sheen-producing substances and auxiliary ingredients which may be used to produce tubing and sheeting of the character contemplated by the invention.

Example 3

|  | Parts |
|---|---|
| Paispearl paste | 10 |
| thinned with |  |
| Butyl acetate | 40 |
| Methyl methacrylate syrup containing 10% dibutyl phthalate | 1000 |
| Benzoyl peroxide | 0.5 |

Example 4

|  | Parts |
|---|---|
| Paispearl paste | 3 |
| thinned with |  |
| Butyl acetate | 40 |
| Methyl methacrylate syrup | 1000 |
| Acetaldehyde | 10 |
| Solution of Celanthrene Fast Yellow GL, 4 grams per liter in monomeric methyl methacrylate | 80 |

Example 5

|  | Parts |
|---|---|
| Lead carbonate "Pearl" | 4 |
| in |  |
| Pyroxylin dope (10%) | 23 |
| Acetone | 27 |
| Methyl methacrylate syrup containing 10% dibutyl phthalate | 1000 |
| Benzoyl peroxide | 0.25 |

Example 6

|  | Parts |
|---|---|
| Methyl methacrylate syrup | 1000 |
| Acetaldehyde | 9.5 |
| Special Research Lining Bronze (aluminum bronze) | 1.1 |

This gives a very dark gray pearl.

Example 7

Same as Example 6 but with half as much bronze.

Example 8

|  | Parts |
|---|---|
| Methyl methacrylate syrup containing 10% dibutyl phthalate | 1000 |
| Special Research Lining Bronze | 0.6 |
| Rolled dough containing: |  |
|    Polymethyl methacrylate _____ 49 |  |
|    Diamyl phthalate _____ 47.7 | 2 |
|    Copper phthalyl cyanine blue__ 3.3 |  |
| Solution of Celanthrene Fast Yellow GL, 4 grams per liter, in monomeric methyl methacrylate | 95 |
| Acetaldehyde | 10 |

This gives a green pearl.

Example 9

|  | Parts |
|---|---|
| Vinyl acetate syrup | 1000 |
| Benzoyl peroxide | 0.5 |
| Special Research Lining Bronze | 0.5 |

Example 10

|  | Parts |
|---|---|
| Styrol, partially polymerized to a syrup | 1000 |
| Paispearl paste | 6 |
| thinned with |  |
| Dibutyl phthalate | 50 |
| Benzoyl peroxide | 0.5 |

It will be understood that the above examples are merely illustrative and that the invention is broadly applicable to liquid organic compounds that may be polymerized to solid synthetic resins and shrink in the conversion from liquid to solid.

Usually a compound will be selected that polymerizes to a substantially rigid product.

The position of the mold during polymerization is preferably vertical but may be held in other positions. The use of pressure exerted by an inert gas is optional but facilitates the production of a flawless product and is particularly useful where the mold is held in a horizontal position. Any of the light reflecting lamellae known in the plastics art for the production of integral sheen may be used in the present invention, such lamellae including fish-scale essence, mercurous chloride in the form of light reflecting lamellae, aluminum bronze, "gold" bronze, lead carbonate and lead iodide in the form of light reflecting lamellae.

The resin forming liquid may be colored by the addition of suitable dyestuffs or pigments and various plasticizers and other modifying agents may be used to obtain a product having special properties.

It is ordinarily preferable to start with the polymerizable liquid organic compound in partially polymerized condition, i. e., as a more or less viscous syrup rather than with straight monomeric liquid. The use of syrup shortens the duration of the process and also reduces any tendency the light reflecting lamellae to settle out under the influence of gravity.

If, instead of a uniform suspension of light reflecting lamellae in the monomeric liquid, there be used a liquid in which the lamellae have not been uniformly distributed, such as an imperfect mixture of two portions of partially polymerized syrup of the same viscosity, of which one contains lamellae and the other does not, the method of this invention will result in the formation of a rod in which areas and zones of integral sheen are interspersed with areas and zones without sheen. In Figs. 7 and 8 such a product is represented diagrammatically, reference numeral 10, 10 designating the light reflecting lamellae and showing that they only occur in certain zones.

The present invention in one form is also adapted to produce rods having an integral sheen of an irregular character and highly attractive in appearance. This is accomplished by making two or more batches of a polymerizable resin-forming organic compound of different viscosities, one of which is readily flowable and contains light reflecting lamellae, the other or others being of higher viscosity and containing light reflecting lamellae or not, as desired. The two or more batches of resin-forming material are intermingled and loaded into the mold and, thereafter, processed as disclosed herein. The effect of introducing the higher viscosity material is to interrupt or distort the concentric orientation of the lamellae in the low viscosity material by interposing, in the line of orienting flow within the low viscosity material caused by the shrinkage due to polymerization of the monomer, obstacles in the form of discrete masses of material of high viscosity.

It will be understood that the higher viscosity resin-forming material is not limited to a flowable liquid but includes material of which the viscosity has been still further raised, i. e., material in the form of a gel or even a solid. To obtain the characteristic effect produced by this form of the invention, the polymerizable resin-forming liquid introduced into the mold must be composed of at least two intermingled portions having distinctly different viscosities. If the viscosity of the two portions was not appreciably different, a more or less uniform blending of the two would result and the optical effects here described would not be obtained.

The optical effect obtained through the use of a mixture of different viscosity polymerizable resin-forming materials in the present invention is an irregular sheen as distinguished from the smooth, uniform sheen obtained otherwise. Where the higher viscosity material is a liquid, an integral sheen characterized by a unique undulating effect is obtained. If fragments of solid polymer are used as the higher viscosity material, an integral sheen of more broken and irregular character is obtained. Intermediate effects are obtained where the higher viscosity material is an extremely viscous liquid or a gel. In each instance, the lamellae in the lower viscosity material tend to become concentrically oriented and do become so oriented to an appreciable extent where the higher viscosity material has not interfered, so that novel optical effects heretofore unknown are obtained.

The higher viscosity resin-forming material may also contain light reflecting lamellae; in the case of a solid, the orientation of the lamellae is fixed and will not be altered during the steps of the process. With viscous liquids, the lamellae may be sufficiently influenced by the flow in the mold caused by shrinkage during polymerization to become more or less concentrically oriented, or they may persist in the orientation which they assume when introduced into the mold, the viscosity of the liquid being an influencing factor.

An advantage of the present invention is that it provides a means of preparing cast synthetic resins in the form of rods, or like elongated bodies, characterized by having an unbroken, uniform, brilliant integral sheen visible over their entire peripheral surfaces. The sheen producing lamellae are oriented concentric with the axis of the rod so that the sheen is available also on peripheral surfaces which may be uncovered by machining the rods. The resulting rods offer means of making shaped and fabricated articles of unique and beautiful appearance. The transparency and freedom from color of synthetic resins available for use in this invention, and the availability of the corresponding monomeric liquid polymerizable organic compounds in clean and uncontaminated form enhance the brilliancy and purity of color of the cast products so prepared. A further advantage of the invention is that it provides means of preparing rods, or like elongated bodies, having an undulating or broken integral sheen of great brilliance and attractiveness.

As many apparently widely different embodiments of this invention may be made without departing from the spirit and scope thereof, it is to be understood that the invention is not limited to the specific embodiments thereof except as defined in the appended claims.

We claim:

1. Process of concentrically orienting light reflecting lamellae in rods with respect to their major axes where said rods are formed by polymerizing a polymerizable liquid organic compound adapted to give a polymer solid at ordinary temperatures, which comprises mixing and suspending light reflecting lamellae in said organic compound, introducing a substantial volume of the resulting mixture into an elongated mold closed at one end, applying heat to a narrow zone at the closed end of the mold while said mold is substantially vertically positioned, until said organic compound in that zone is substantially polymerized, and progressively advancing the heating zone along the major axis of the mold at about the rate at which said organic compound in the mold is being polymerized, while maintaining the liquid organic compound ahead of the advancing heating zone at a temperature below that at which said organic compound will undergo active polymerization.

2. Process of concentrically orienting light reflecting lamellae in rods with respect to their major axes where said rods are formed by polymerizing a polymerizable liquid organic compound adapted to give a polymer solid at ordinary temperatures, which comprises mixing and suspending light reflecting lamellae in said organic compound, introducing a substantial volume of the resulting mixture into an elongated mold closed at one end, vertically introducing the mold, closed end down, into a liquid bath at a temperature sufficient to induce polymerization of said organic compound, and progressively advancing the level of the liquid bath up the vertically positioned mold at approximately the rate at which said organic compound is being polymerized while maintaining said organic compound above the level of the liquid bath at a temperature below that at which said organic compound will undergo active polymerization.

3. Process of concentrically orienting light reflecting lamellae in rods with respect to their major axes where said rods are formed by polymerizing liquid methyl methacrylate, which comprises mixing and suspending light reflecting lamellae in said liquid methyl methacrylate, introducing a substantial volume of the resulting mixture into an elongated mold closed at one end, applying heat to a narrow zone at the closed end of the mold while said mold is substantially vertically positioned, until said methyl methacrylate in that zone is substantially polymerized, and progressively advancing the heating zone along the major axis of the mold at about the rate at which the methyl methacrylate in the mold is being polymerized while maintaining the liquid methyl methacrylate ahead of the advancing heating zone at a temperature below that at which the methyl methacrylate will undergo active polymerization.

4. Process of concentrically orienting light reflecting lamellae in rods with respect to their major axes where said rods are formed by polymerizing liquid methyl methacrylate, which comprises mixing and suspending light reflecting lamellae in said liquid methyl methacrylate, introducing a substantial volume of the resulting mixture into an elongated mold closed at one end, vertically introducing the mold, closed end down, into a liquid bath at a temperature sufficient to induce polymerization of said liquid methyl methacrylate, and progressively advancing the level of the liquid bath up the vertically positioned mold at approximately the rate at which said liquid methyl methacrylate is being polymerized while maintaining said liquid methyl methacrylate above the level of the liquid bath at a temperature below that at which said organic compound will undergo active polymerization.

5. Process of concentrically orienting light reflecting lamellae in rods with respect to their major axes where said rods are formed by polymerizing a polymerizable liquid organic compound adapted to give a polymer solid at ordinary temperatures, which comprises introducing into an elongated mold closed at one end said liquid organic compound, said liquid organic compound being composed of at least two intermingled portions having distinctly different viscosities, the portion having the lower viscosity containing light reflecting lamellae suspended therein, applying heat to a narrow zone at the closed end of the mold while said mold is substantially vertically positioned, until said liquid organic compound in that zone is substantially polymerized, and progressively advancing the heating zone along the major axis of the mold at about the rate at which said liquid organic compound in the mold is being polymerized, while maintaining the polymerizable liquid organic compound ahead of the advancing heating zone at a temperature below that at which said liquid organic compound will undergo active polymerization.

6. A cast rod of a polymerized organic compound characterized by having light reflecting lamellae oriented concentrically with respect to the major axis thereof, said orientation being interrupted or distorted to give a non-uniform integral sheen on the peripheral surface of the rod.

7. A cast rod of a polymerized organic compound containing light reflecting lamellae distributed therethrough, said lamellae being oriented concentrically with respect to the major axis of said rod.

8. A cast rod of a polymerized organic compound containing light reflecting lamellae substantially uniformly distributed therethrough, said lamellae throughout the rod being oriented concentrically with respect to the major axis of said rod.

9. A cast rod of polymerized methyl methacrylate containing light reflecting lamellae distributed therethrough, said lamellae being oriented concentrically with respect to the major axis of said rod.

10. A cast rod of polymerized methyl methacrylate containing light reflecting lamellae substantially uniformly distributed therethrough, said lamellae throughout the rod being oriented concentrically with respect to the major axis of said rod.

11. A cast rod of polymerized methyl methacrylate characterized by having light-reflecting lamellae oriented concentrically with respect to the major axis thereof, said orientation being interrupted or distorted to give a non-uniform integral sheet on the peripheral surface of the rod.

CHARLES M. FIELDS.
GEORGE A. WILKENS.